(12) United States Patent
Noda et al.

(10) Patent No.: US 7,663,811 B2
(45) Date of Patent: Feb. 16, 2010

(54) DRIVING MECHANISM, DRIVING DEVICE, AND LENS DRIVING DEVICE

(75) Inventors: Atsuhiro Noda, Ashiya (JP); Takashi Matsuo, Suita (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/182,502

(22) Filed: Jul. 30, 2008

(65) Prior Publication Data
US 2009/0034094 A1 Feb. 5, 2009

(30) Foreign Application Priority Data
Aug. 2, 2007 (JP) ............................. 2007-202093

(51) Int. Cl.
G02B 15/14 (2006.01)
G02B 27/64 (2006.01)
G02B 7/02 (2006.01)
G11B 3/00 (2006.01)

(52) U.S. Cl. .................... 359/696; 359/694; 359/554; 359/822; 359/823; 396/133; 396/97; 396/144

(58) Field of Classification Search ......... 359/694–696, 359/813, 814, 822–824, 554, 557; 396/85–89, 396/97, 129, 133, 144, 427, 478; 348/143
See application file for complete search history.

(56) References Cited

U.S. PATENT DOCUMENTS

| 6,449,434 | B1 | * | 9/2002 | Fuss | ............................ | 396/97 |
| 2007/0280668 | A1 | * | 12/2007 | Kubo et al. | ................. | 396/133 |
| 2009/0052037 | A1 | * | 2/2009 | Wernersson | ................ | 359/554 |

FOREIGN PATENT DOCUMENTS

| JP | 2002-130114 A | 5/2002 |
| JP | 2005-156892 A | 6/2005 |
| JP | 2005-195998 A | 7/2005 |

* cited by examiner

*Primary Examiner*—Loha Ben
(74) *Attorney, Agent, or Firm*—Sidley Austin LLP

(57) ABSTRACT

A driving mechanism, a driving device, and a lens driving device includes a lever member. The lever member includes an arm portion for surrounding a part of a driven member in a side direction. The arm portion has a plurality of displacement output portions to be engaged with the driven member. The lever member is constructed in such a manner that a displacement amount of the displacement output portions in a predetermined first axis direction is set larger than a displacement amount of a displacement input portion to be generated by input of a moving force to be applied by a shape memory alloy actuator. The driving mechanism, the driving device, and the lens driving device enable to obtain a large displacement amount with a reduced size and a reduced weight, and stably move the driven member.

10 Claims, 9 Drawing Sheets

DRIVING MECHANISM, DRIVING DEVICE, AND LENS DRIVING DEVICE

This application is based on Japanese Patent Application No. 2007-202093 filed on Aug. 2, 2007, the contents of which are hereby incorporated by reference.

BACKGROUND OF THE INVENTION

1. Field of the Invention

The present invention relates to a driving mechanism for driving a lens unit constituting an image pickup optical system in e.g. a camera phone for zoom control, focus control, or a like control, as well as a driving device incorporated with the driving mechanism, and a lens driving device incorporated with the driving mechanism.

2. Description of the Related Art

In recent years, a high-resolution image pickup device has been developed. For instance, the number of pixels of an image sensor to be loaded in a camera phone or a like device has been spectacularly increased. As the high-resolution image pickup device has been developed, a focus function, a zoom function, or a like function has been demanded, in addition to a basic function, i.e., an image shooting function.

A lens driving device for moving a lens in the optical axis direction is necessary to impart the aforementioned additional functions to the camera phone. In recent years, various applications of a lens driving device incorporated with a shape memory alloy (hereinafter, called as "SMA") actuator have been proposed. The lens driving device is constructed in such a manner that a contraction force is generated by energizing and heating the SMA actuator, and the contraction force is utilized as a lens driving force. Generally, a lens driving device incorporated with an SMA actuator is advantageous in easily reducing the size and the weight of the lens driving device, or obtaining a relatively large magnitude of force.

As a lens driving mechanism incorporated with an SMA actuator, for instance, there are known structures as disclosed in e.g. Japanese Unexamined Patent Publication No. 2005-195998 (D1), Japanese Unexamined Patent Publication No. 2002-130114 (D2), and Japanese Unexamined Patent Publication No. 2005-156892 (D3). D1 discloses an arrangement, wherein an SMA wire is spirally wound around an outer surface of a cam cylinder for guiding a lens in the optical axis direction to pivotally move the cam cylinder by a contraction force of the SMA wire. D2 discloses an arrangement, wherein an SMA wire is wound between a lens frame and a fixed portion to move the lens frame by a contraction force of the SMA wire. D3 discloses a lens driving mechanism including a mechanism for magnifying a contraction force of an SMA wire with use of a gear mechanism.

In the case where a high-performance focus function, a high-performance zoom function, or a like high-performance function is provided in a camera phone or a like device, it is necessary to greatly and stably displace a lens while reducing the size and the weight of the lens driving mechanism. Generally, however, a contraction displacement amount obtainable by energizing and heating an SMA wire is at most about several percentages with respect to the entire length of the SMA wire. Considering durability of the SMA wire, an allowable displacement range is at most about 3%. Accordingly, in the approach of directly driving a lens, i.e., a lens frame by an SMA actuator, as proposed in the arrangements of D1 and D2, a movable distance of a lens is relatively small, and it is difficult to obtain a lens moving amount required in high-performance auto-focusing or high-performance optical zooming, despite the advantages that stable lens displacement is secured, and the size and the weight of the lens driving mechanism are reduced. In the arrangement of D3, although a certain lens moving amount is secured, it is difficult to reduce the size and the weight of the lens driving device, because loading a gear mechanism is necessary.

SUMMARY OF THE INVENTION

In view of the above conventional examples, it is an object of the present invention to provide a driving mechanism, a driving device, and a lens driving device, provided with an SMA actuator, capable of greatly and stably moving a driven member, while reducing the size and the weight thereof.

A driving mechanism, a driving device, and a lens driving device according to an aspect of the invention includes a lever member. The lever member includes an arm portion for surrounding a part of a driven member in a side direction. The arm portion has a plurality of displacement output portions to be engaged with the driven member. The lever member is constructed in such a manner that a displacement amount of the displacement output portion in a predetermined first axis direction is set larger than a displacement amount of a displacement input portion to be generated by input of a moving force to be applied by a shape memory alloy actuator. The driving mechanism, the driving device, and the lens driving device enable to obtain a large displacement amount with a reduced size and a reduced weight, and stably move the driven member.

These and other objects, features and advantages of the present invention will become more apparent upon reading the following detailed description along with the accompanying drawings.

BRIEF DESCRIPTION OF THE DRAWINGS

FIGS. 2A and 2B are schematic side views of the lens driving device, i.e., diagrams viewed from the direction of the arrow II in FIG. 1, wherein FIG. 2A shows a state before an SMA actuator is actuated, and FIG. 2B shows a state after the SMA actuator is actuated.

DETAILED DESCRIPTION OF THE PREFERRED EMBODIMENTS OF THE INVENTION

Figure 1:
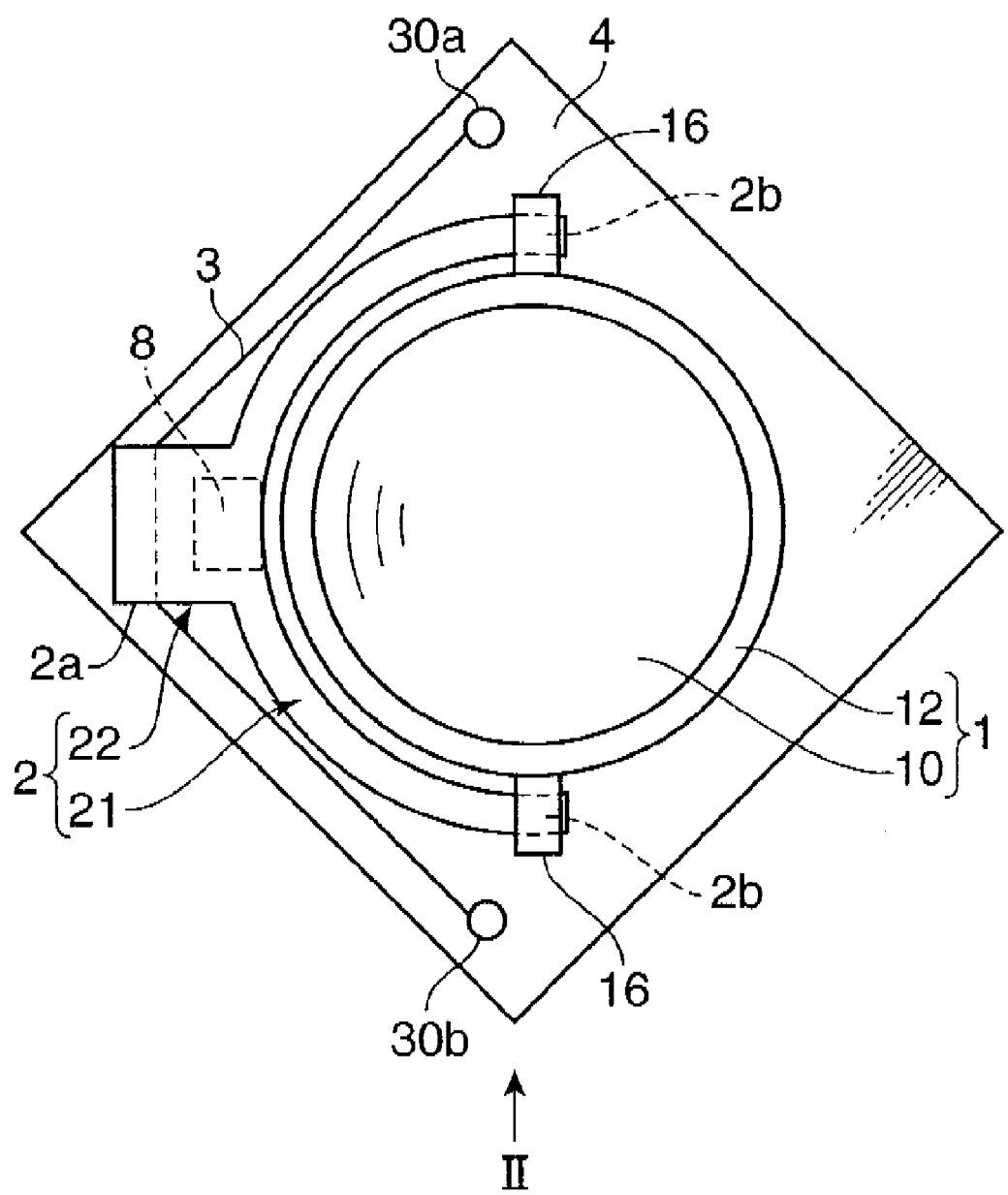
FIG. 1 is a schematically plan view showing a primary part of a lens driving device in accordance with a first embodiment of the invention.

In the following, embodiments of the invention are described referring to the drawings. Elements having the same reference numerals throughout the drawings have substantially the same construction, and repeated description thereof is omitted herein.

First Embodiment

Figure 2A:
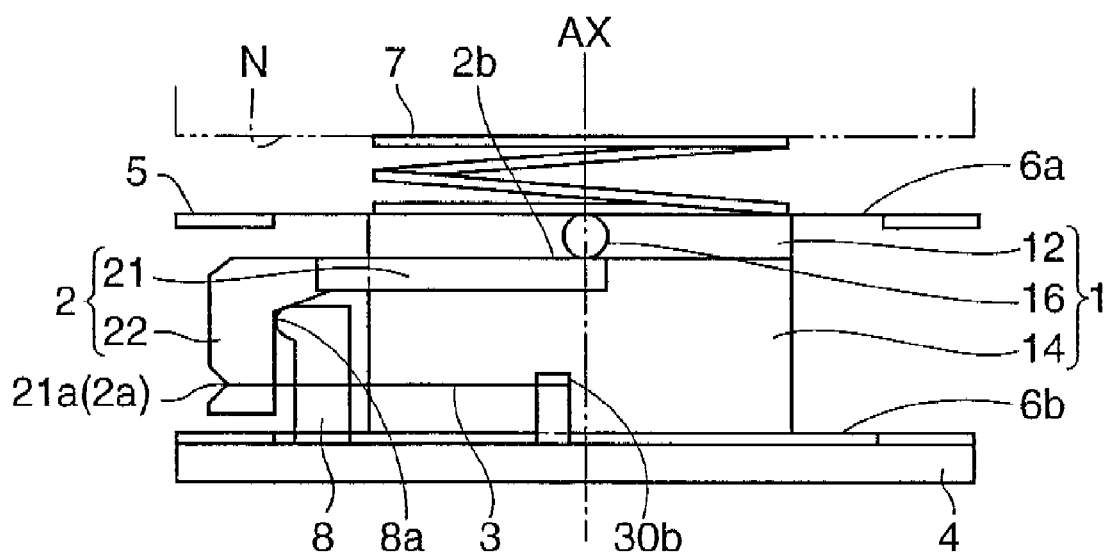
Figure 2B:
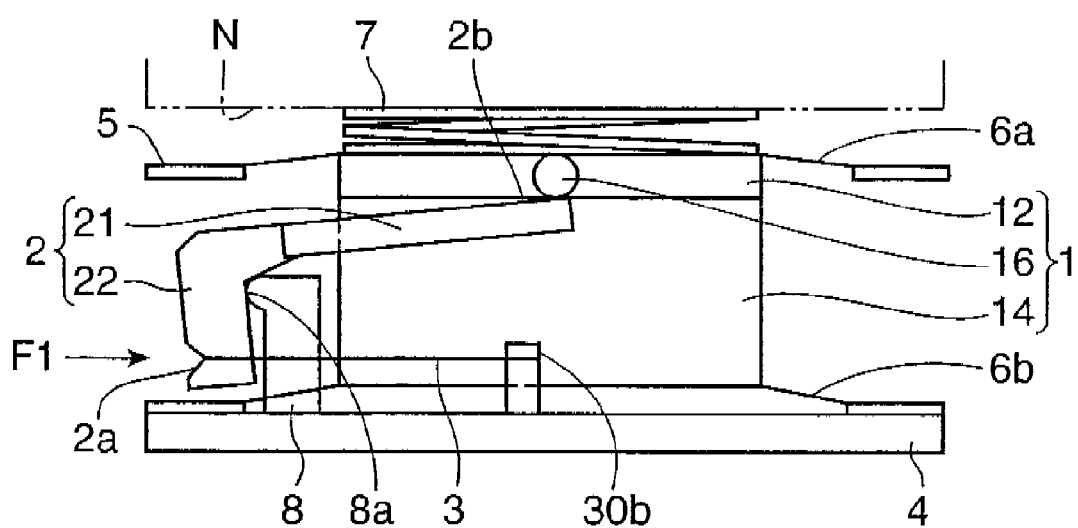

FIGS. 1 through 2B are diagrams schematically showing a primary part of a lens driving device in accordance with the first embodiment of the invention. FIG. 1 is a plan view of the lens driving device, and FIGS. 2A and 2B are side views respectively showing the lens driving device.

The lens driving device primarily includes a lens unit 1 as a driven member, a lever member 2 for moving the lens unit 1 in an optical axis AX direction, i.e., a first axis direction, an SMA actuator 3, a base member 4, a top plate 5, parallel-plate springs 6a and 6b, and a bias spring 7. The lens unit 1 and the relevant parts are mounted on the base member 4. In FIG. 1, the top plate 5, and the parallel plate springs 6a and 6b are not illustrated for simplifying the description. The lens driving device is applied to a driving mechanism and a driving device.

The base member 4 is fixed to a member for mounting the lens driving device e.g. a frame or a mount substrate of a mobile phone. The base member 4 is an unmovable member constituting a bottom surface of the lens driving device. The base member 4 is formed into a rectangular plate-like shape in plan view, and is made of a resin material or a like material in its entirety.

The lens unit 1 has a cylindrical shape, and includes an image pickup lens 10, a lens driving frame 12 for holding the image pickup lens 10, and a lens barrel 14 for housing the lens driving frame 12 therein. The image pickup lens 10 includes an objective lens, a focus lens, a zoom lens, and the like, and constitutes a focusing optical system for focusing a subject optical image on a light receiving surface of an unillustrated image sensor. The lens driving frame 12 is a lens frame, and is moved in the optical axis AX direction along with the lens barrel 14. A pair of support portions 16 are radially outwardly formed on an outer perimeter at a lead end portion of the lens driving frame 12 on the object side in a state that the paired support portions 16 are circumferentially away from each other by 180 degrees in angle.

The lens unit 1 is arranged on the base member 4 in a state that the lens unit 1 is mounted in an opening formed in the top plate 5. More specifically, the paired support portions 16 are arranged at respective corresponding positions near a pair of diagonal corner portions of the base member 4 (see FIG. 1). The parallel plate springs 6a and 6b are fixed to the top plate 5 and the base member 4, respectively. The lens unit 1 is fixed to the parallel plate springs 6a and 6b. In this arrangement, the lens unit 1 is displaceably supported with respect to the base member 4 and the relevant parts, and the freedom in displacement is restrained in a direction along the optical axis AX. The top plate 5 may be fixed to the base member 4 via an unillustrated post or a like member, or may be integrally formed with the base member 4.

The lever member 2 applies, to the lens unit 1, a driving force for driving the lens unit 1 in the optical axis AX direction by engagement with the lens unit 1 via the support portions 16.

The lever member 2 is mounted on a side of the lens unit 1, more specifically, at a corner portion of the base member 4 other than the diagonal corner portions where the support portions 16 of the lens unit 1 are mounted. The lever member 2 is pivotally supported around an axis orthogonal to the optical axis AX and extending in a direction along which the paired support portions 16 are arranged, i.e., vertical directions in FIG. 1.

As shown in FIG. 2A, the lever member 2 has an inverted L-shape in side view, and includes an arm portion 21 and an extension 22 extending from a base end of the arm portion 21 in the optical axis AX direction. The lever member 2 is supported on the base member 4 in a state that a bent portion corresponding to a boundary portion between the arm portion 21 and the extension 22 is supported on a lead end of an upright support leg 8 formed on the base member 4. The lead end (hereinafter, called as a "lever support portion 8a") of the support leg 8 has a substantially cylindrical column-like shape extending in a direction orthogonal to the optical axis AX direction, i.e., a direction orthogonal to the plane of FIG. 2A. In this arrangement, the lever member 2 is pivotally supported around the axis orthogonal to the optical axis AX direction, by using the lever support portion 8a as a pivotal axis.

The arm portion 21 has a substantially arc shape in plan view. More specifically, as shown in FIG. 1, the arm portion 21 is split into two curved portions at the extension 22 toward opposite sides of the lens unit 1 in such a manner that each curved portion extends substantially by the same length in proximity to the outer surface of the lens unit 1, whereby the arm portion 21 as a whole surrounds substantially a half circumferential part of the lens unit 1. Lead ends, i.e., both ends of the arm portion 21 reach the positions of the paired support portions 16 of the lens unit 1, respectively. The SMA actuator 3 to be described later is wound around the extension 22 at a predetermined winding position (hereinafter, called as a "displacement input portion 2a"). A moving force F1 in a direction (i.e. a second axis direction corresponding to sideway directions in FIG. 2A) orthogonal to the optical axis AX direction is applied to the displacement input portion 2a, whereby the lever member 2 is pivotally moved. As the lever member 2 is pivotally moved, lead ends (hereinafter, called as "displacement output portions 2b") of the arm portion 21 are displaced in the optical axis AX direction, and a driving force in the optical axis AX direction is applied to the lens unit 1 by engagement of the displacement output portions 2b with the respective corresponding support portions 16.

The SMA actuator 3 is adapted to apply the moving force F1 to the lever member 2, and is a wire actuator constituted of a shape memory alloy (SMA) wire made of e.g. a Ni—Ti alloy. The SMA actuator 3 has a property that the SMA actuator 3 is expanded by application of a predetermined tension while the SMA actuator 3 is in a condition having a low temperature and a low elastic coefficient corresponding to a martensite phase; is transited to a condition having a high elastic coefficient corresponding to an austenite phase as a mother phase by phase transformation at a predetermined temperature or higher than the predetermined temperature by heat application in the expanded state; and returns to the initial length from the expanded state, i.e., recovers the shape thereof. In this embodiment, the aforementioned phase transformation is performed by energizing and heating the SMA actuator 3. Specifically, the SMA actuator 3 is a conducive member having a predetermined resistance value. In view of this, the SMA actuator 3 is constructed in such a manner that a Joule heat is generated by energization of the SMA actuator 3, and the SMA actuator 3 is transformed from a martensite phase to an austenite phase by a self exothermic operation of the SMA actuator 3 based on the Joule heat. For performing the above operation, a first electrode 30a and a second electrode 30b for energizing and heating the SMA actuator 3 are fixedly mounted at both ends of the SMA actuator 3. The first electrode 30a and the second electrode 30b are fixed to predetermined electrode fixing portions to be formed on the base member 4.

As shown in FIG. 1, the SMA actuator 3 is wound around the extension 22 of the lever member 2 into a substantially L-shape. In this arrangement, when the SMA actuator 3 is energized and heated via the first electrode 30a and the second 30b, and actuated i.e. contracted, the moving force F1 is applied to the lever member 2, whereby the lever member 2 is pivotally moved by the moving force F1.

The first electrode 30a and the second electrode 30b are arranged near the respective corresponding support portions 16 of the lens unit 1 on the base member 4. The length of the SMA actuator 3 from the first electrode 30a to a turning point of the SMA actuator 3 is set substantially equal to the length of the SMA actuator 3 from the second electrode 30b to the turning point. Thereby, expansion/contraction amounts of the SMA actuator 3 at both ends of the displacement input portion 2a are substantially made equal to each other, thereby enabling to prevent friction of the SMA actuator 3 against the lever member 2 during actuation of the SMA actuator 3. Also, a V-shaped groove 22a, corresponding to the displacement input portion 2a, is formed in the extension 22. Winding the SMA actuator 3 in the V-shaped groove 22a enables to stably wind the SMA actuator 3 around the lever member 2.

The bias spring 7 is adapted to urge the lens unit 1 in one direction along the optical axis AX, i.e., a direction opposite to a direction in which the displacement output portions 2b are moved, by actuation, i.e., contraction of the SMA actuator 3. The bias spring 7 includes a compression coil spring having a diameter substantially equal to a circumferential size of the lens driving frame 12. One end, i.e., a lower end of the bias spring 7 is abutted against a top surface of the lens driving frame 12. The other end, i.e., an upper end of the bias spring 7 is abutted against a fixed portion N such as an inner wall of a housing of a mobile phone.

The magnitude of force of the bias spring 7 is set smaller than the moving force F1 to be applied to the lever member 2. In this arrangement, while the SMA actuator 3 is in an inoperative state, the lens unit 1 is pressed toward the base member 4. On the other hand, once the SMA actuator 3 is actuated, the lens unit 1 is moved in the opposite direction, i.e., toward the object side against a pressing force of the bias spring 7. In other words, the bias spring 7 applies, to the lens unit 1, a biasing load to return the lens unit 1 to a home position while energization and heating of the SMA actuator 3 is not performed.

The wire length of the SMA actuator 3 is set to such a value that the SMA actuator 3 is subjected to tension by receiving a pressing force of the bias spring 7 acting via the support portions 16 of the lens unit 1 and the lever member 2, while the SMA actuator is in an inoperative state. In other words, the wire length of the SMA actuator 3 is set to such a value that the arm portion 21 of the lever member 2 is constantly abutted against, i.e., pressed against the support portions 16 of the lens unit 1, irrespective of an actuated state of the SMA actuator 3. In this embodiment, the above arrangement enables to pivotally support the lever member 2 on the lead end of the support leg 8, without direct connection of the support leg 8 to the lever member 2. The above arrangement also enables to promptly transmit the displacement of the SMA actuator 3 for pivotal movement of the lever member 2, once the SMA actuator is actuated.

In the lens driving device having the above arrangement, in the case where energization and heating of the SMA actuator 3 is not performed, in other words, the SMA actuator 3 is in a suspended state, i.e., an expanded state, the lens unit 1 is pressed toward the base member 4 by a pressing force of the bias spring 7. Thereby, the lens unit 1 is retained at the home position (see FIG. 2A) On the other hand, once the SMA actuator 3 is actuated, i.e., contracted, the moving force F1 is applied to the displacement input portion 2a of the lever member by the actuation of the SMA actuator 3, thereby pivotally moving the lever member 2 and consequently moving the displacement output portions 2b in the optical axis AX direction (see FIG. 2B). As a result of the displacement, a driving force to move the lens unit 1 toward the object side is applied to the lens unit 1, and the lens unit 1 is moved against the pressing force of the bias spring 7. In performing this operation, the magnitude of the moving force F1 is adjusted by control of an energization current to be applied to the SMA actuator 3, thereby adjusting the displacement amount of the lens unit 1.

Then, in the case where the energization of the SMA actuator 3 is suspended, or the applied voltage is lowered to a predetermined value, the SMA actuator 3 is cooled, and returns to a martensite phase. As a result, the moving force F1 is gone, and the lens unit 1 is returned to the home position along the optical axis AX by a pressing force of the bias spring 7. In this way, controlling on and off energization of the SMA actuator 3 enables to displace the lens unit 1 along the optical axis AX direction. Also, adjusting the magnitude of the moving force F1 by controlling an energization current to be applied to the first electrode 30a and the second electrode 30b enables to adjust the displacement amount of the lens unit 1.

As described above, the lens driving device is advantageous in desirably moving the lens unit 1 along the optical axis AX in accordance with actuation of the SMA actuator 3.

In particular, the lens driving device is constructed in such a manner that displacement, i.e., contraction of the SMA actuator 3 is increased in two stages for transmission of the displacement, i.e., the contraction to the lens unit 1. Accordingly, a greater displacement than the actual displacement amount, i.e., the actual contraction amount of the SMA actuator 3 can be applied to the lens unit 1. In the following, the above feature is described in detail.

Figure 3:
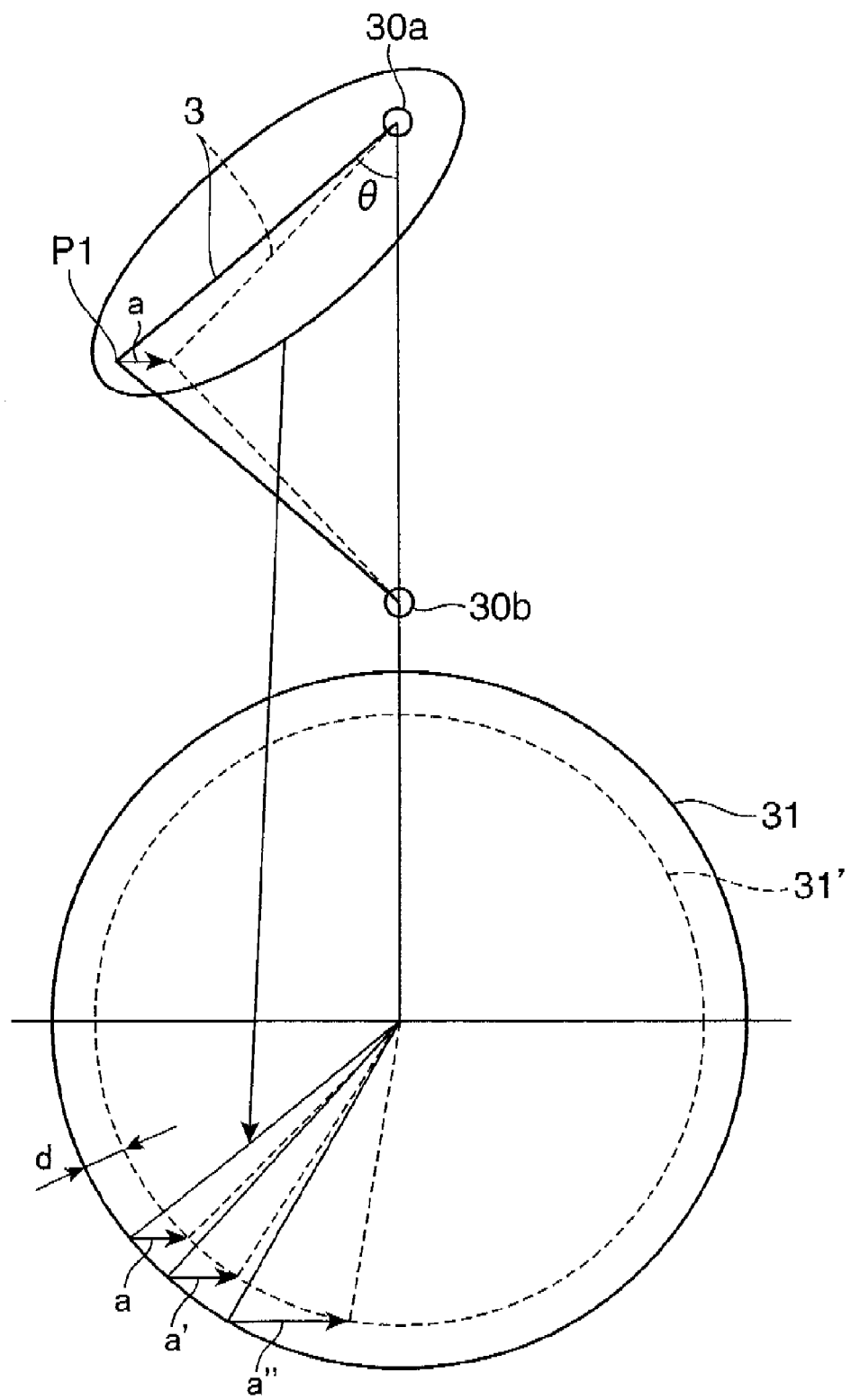
FIG. 3 is a diagram showing a relation between contraction displacement of the SMA actuator, and displacement of a lever member, i.e., displacement of a displacement input portion.

(I) First stage of displacement increase FIG. 3 is a diagram showing a relation between contraction displacement of the SMA actuator 3 and displacement of the displacement input portion 2a of the lever member 2. As shown in the upper illustration in FIG. 3, in an initial state where the SMA actuator 3 is not energized via the first electrode 30a and the second electrode 30b, the SMA actuator 3 is set to a state shown by the solid line in the upper illustration in FIG. 3. On the other hand, once the SMA actuator 3 is energized and heated, the SMA actuator 3 is brought to a contracted state shown by the dotted line in the upper illustration in FIG. 3. The symbol P1 in the upper illustration in FIG. 3 indicates a winding point, corresponding to the displacement input portion 2a, of the SMA actuator 3 with respect to the lever member 2. In other words, a displacement corresponding to the distance "a" can be inputted to the displacement input portion 2a by contraction of the SMA actuator 3.

The lower illustration in FIG. 3 shows circles, wherein the distance from the first electrode 30a, as a center of circle, to the point P1 corresponds to a radius of circle. The solid-line circle 31 corresponds to a state that the SMA actuator 3 is not contracted. The dotted-line circle 31' corresponds to a state that the SMA actuator 3 is contracted. In this case, the actual contraction amount of the SMA actuator 3 corresponds to the distance "d" along a radial direction, i.e., a difference in radius between the solid-line circle 31 and the dotted-line circle 31' The moving distance "a" of the point P1 is set larger than the distance "d". In other words, as is obvious from FIG. 3, a displacement larger than the actual contraction amount of the SMA actuator 3 can be inputted at the point P1.

This is because by bending the SMA actuator 3 into a substantially L-shape at the point P1 corresponding to an intermediate point between the first electrode 30a and the second electrode 30b, the contraction force of the SMA actuator 3 is acted in a direction toward the center of the bent angle, i.e., a direction toward the radial center in alignment with the optical axis AX, without acting in the winding direction of the SMA actuator 3. In this case, as shown in the lower illustration in FIG. 3, as the stretched angle θ of the SMA actuator 3 is decreased, the displacement input amount is increased, as shown by the moving distances "a", "a'", "a''", . . . .

Figure 4:
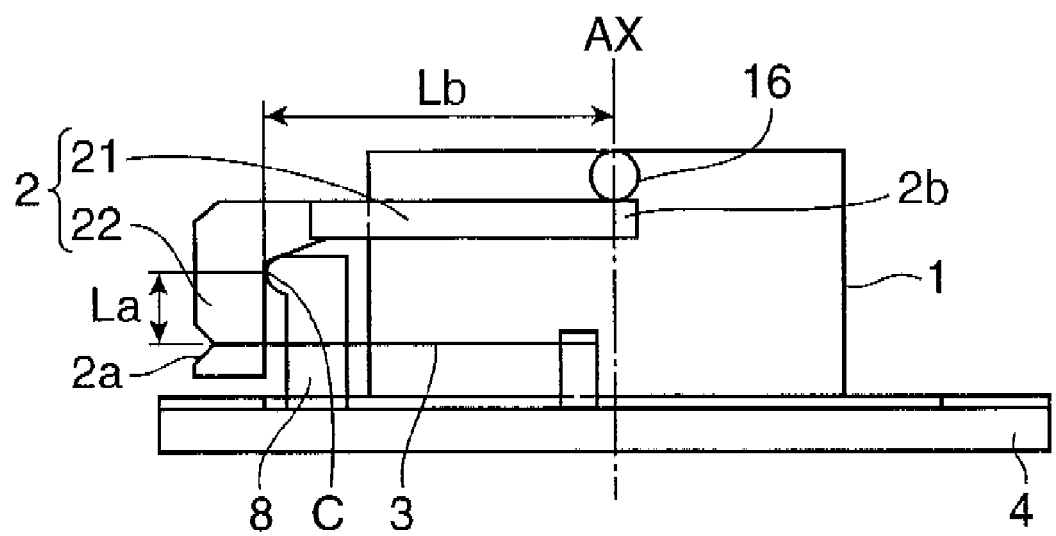
FIG. 4 is a schematic side view for describing a concrete arrangement of the lever member.

(II) Second stage of displacement increase FIG. 4 is a schematic side view showing a displacement relation between the lever member 2 and the lens unit 1. As described above, the lever member 2 has a substantially L-shape, and is bent at a position corresponding to a pivotal axis of the lever member 2. Assuming that the distance from a pivotal axis C to the displacement input portion 2a is La, and the distance from the pivotal axis C to the displacement output portion 2b is Lb, the following relation is established between the distance La, the distance Lb, the displacement amount of the displacement input portion 2a by the moving force F1, i.e., the displacement amount in a direction orthogonal to the optical axis AX, and the displacement amount of the displacement output portion 2b in the optical axis AX direction:

(displacement amount of displacement output portion 2b)=(displacement amount of displacement input portion 2a)×Lb/La Accordingly, constructing the lever member 2 in such a manner as to satisfy Lb/La>1 enables to make the displacement of the displacement output portion 2b larger than the displacement of the displacement input portion 2a by actuation, i.e., contraction of the SMA actuator 3. In this embodiment, the lever member 2 is constructed in such a manner as to satisfy Lb/La≧5.

As described above, the lens driving device is constructed in such a manner that in the first stage of displacement increase, a displacement larger than the actual contraction amount or the actual expansion/contraction amount of the SMA actuator 3 is applied to the displacement input portion 2a; and in the second stage of displacement increase, a displacement larger than the displacement of the displacement input portion 2a is applied to the displacement output portions 2b by pivotal movement of the lever member 2. Accordingly, the lens driving device having the above arrangement is advantageous in applying, to the lens unit 1, a greater displacement than the actual displacement amount of the SMA actuator 3. This arrangement enables to properly secure a lens moving amount required in auto-focusing or optical zooming even in use of an SMA actuator having a relatively small displacement amount, i.e., a relatively small contraction amount.

In the lens driving device, the paired support portions 16 are formed on the lens unit 1, and the lever member 2 is constructed in such a manner that the arm portion 21 is formed into a substantially arc shape and the lead ends of the arm portion 21, corresponding to the displacement output portions 2b, are engaged with the respective corresponding support portions 16. Thereby, a driving force is applied to the lens unit 1 at two positions circumferentially away from each other by 180 degrees in angle. Accordingly, the lens driving device having the above arrangement enables to transmit the driving force to the lens unit 1 in a well balanced state. Thus, the lens driving device is advantageous in satisfactorily and precisely moving the lens unit 1 along the optical axis AX, while securely preventing oblique movement of the lens unit 1.

Also, as described above, the lever member 2 has such a shape as to partially surround the lens unit 1 in a side direction. Further, as shown in FIGS. 1, 2A, and 2B, the SMA actuator 3 is arranged around the lens unit 1 and on a plane orthogonal to the optical axis AX, i.e., a plane substantially parallel to the base member 4. This arrangement enables to produce a compact lens driving device, wherein the lens unit 1 is housed in the center, and the lever member 2 and the relevant parts are arranged in the periphery of the lens unit 1 in a compact manner. This is advantageous in reducing the size and the weight of the lens driving device.

Further, as described above, the lens driving device is constructed in such a manner that the lever member 2 is supported on the lead end of the support leg 8 without direct connection of the lever member 2 to the support leg 8. The lens driving device having the above arrangement is advantageous in simplifying the structure for pivotally supporting the lever member 2, and effectively reducing the size and the weight of the driving mechanism. The lens driving device is also advantageous in facilitating assembling the parts.

Second Embodiment

In this section, a lens driving device in accordance with the second embodiment of the invention is described. The basic arrangement of the second embodiment is substantially the same as that of the first embodiment. Accordingly, elements which are functionally common between the first embodiment and the second embodiment are indicated by the same reference numerals, detailed description thereof is omitted herein, and differences between the first embodiment and the second embodiment are described in detail. The same idea is also applied to the third embodiment.

Figure 5:
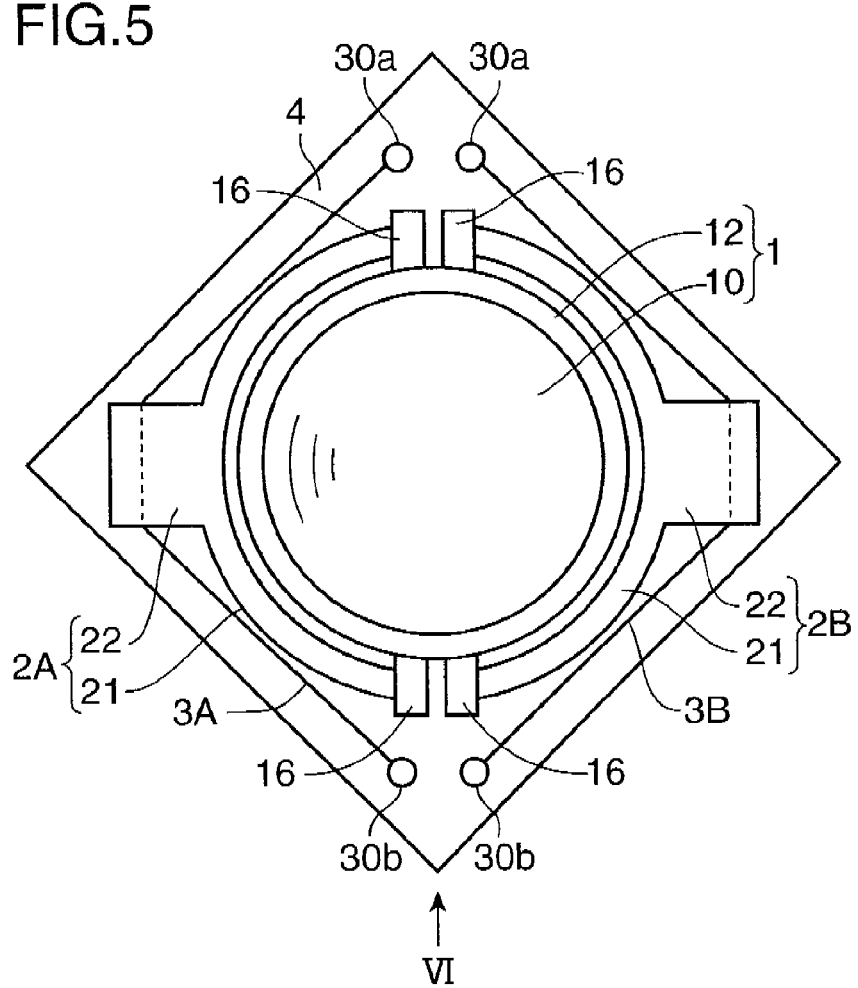
FIG. 5 is a schematic plan view showing a primary part of a lens driving device in accordance with a second embodiment of the invention.
Figure 6:
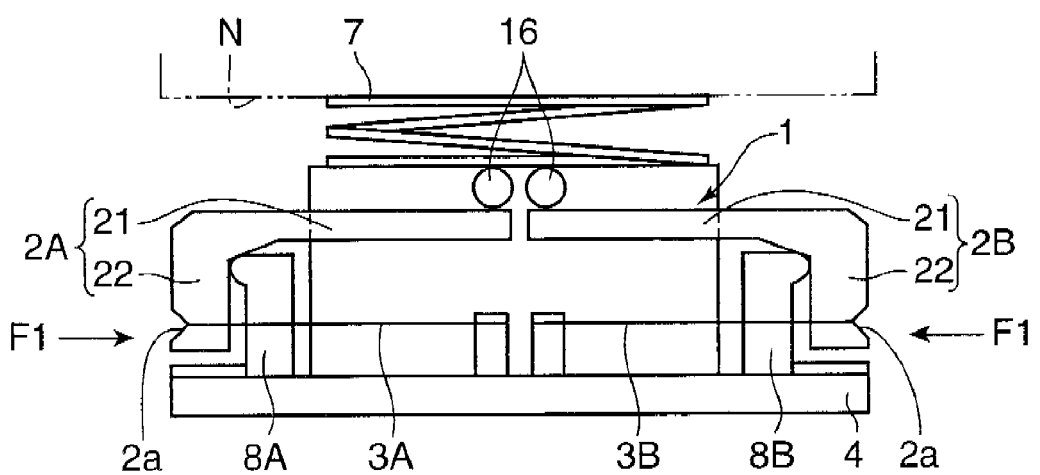
FIG. 6 is a schematic side view, i.e., a diagram viewed from the direction of the arrow VI in FIG. 5, showing the primary part of the lens driving device in accordance with the second embodiment.

FIGS. 5 and 6 are diagrams schematically showing the lens driving device in accordance with the second embodiment FIG. 5 is a plan view of the lens driving device, and FIG. 6 is a side view of the lens driving device, respectively. In FIGS. 5 and 6, a top plate 5 and parallel plate springs 6a and 6b are not illustrated for simplifying the description.

In the lens driving device, parts such as a lever member 2 for driving a lens unit 1 are provided in a pair or a set. Specifically, a first lever member 2A, a first support leg 8A, and a first SMA actuator 3A are provided on one side corresponding to the left side in FIGS. 5 and 6; and a second lever member 2B, a second support leg 8B, and a second SMA actuator 3B are provided on the other side corresponding to the right side in FIGS. 5 and 6 with respect to a diagonal of a base member 4, as opposed to each other. Two pairs of support portions 16 for individually engaging with the first lever member 2A and the second lever member 2B are provided on the lens unit 1 in such a manner that one of the paired support portions 16 to be engaged with the first lever member 2A and a corresponding one of the paired support portions 16 to be engaged with the second lever member 2B are disposed in proximity to each other, and the other of the paired support portions 16 to be engaged with the first lever member 2A and the corresponding other of the paired support portions 16 to be engaged with the second lever member 2B are disposed in proximity to each other.

In the lens driving device having the above arrangement, by actuation, i.e., contraction of the first SMA actuator 3A and the second SMA actuator 3B, moving forces F1 are applied to a displacement input portion 2a of the first lever member 2A and a displacement input portion 2a of the second lever member 2B, respectively. Then, the first lever member 2A and the second lever member 2B are pivotally moved by the respective corresponding moving forces F1, and displacement output portions 2b of the first lever member 2A and displacement output portions 2b of the second lever member 2B are moved. Thereby, the lens unit 1 is displaced in the optical axis AX direction. In performing this operation, by controlling energization currents to be applied respectively to the first SMA actuator 3A and the second SMA actuator 3B substantially equal to each other, the displacement amount of the displacement output portions 2b of the first lever member 2A and the displacement amount of the displacement output portions 2b of the second lever member 2B are made substantially equal to each other.

In the lens driving device in accordance with the second embodiment, the lens unit 1 can be driven at a driving force twice as large as the driving force in the first embodiment, because the lens unit 1 is driven by the first lever member 2A and the second lever member 2B. This enables to perform position control of the lens unit 1 at a higher speed, thereby enabling to perform lens movement required in auto-focusing or optical zooming with superior responsiveness.

Third Embodiment

In this section, a lens driving device in accordance with the third embodiment of the invention is described.

Figure 7:
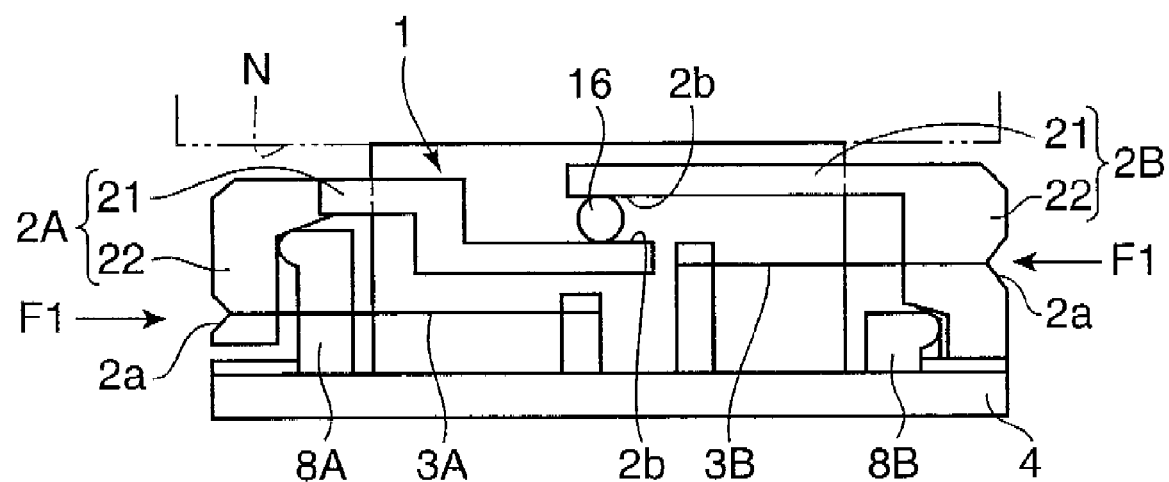
FIG. 7 is a schematic plan view showing a primary part of a lens driving device in accordance with a third embodiment of the invention.

FIG. 7 is a side view schematically showing the lens driving device in accordance with the third embodiment. In FIG. 7, a top plate 5 and parallel plate springs 6a and 6b are not illustrated for simplifying the description. The lens driving device in the third embodiment is substantially the same as the lens driving device in the second embodiment in a point that parts such as a lever member 2 for driving a lens unit 1 are provided in a pair or a set. The third embodiment, however, is different from the second embodiment in a point that the lens unit 1 is movable in two way directions along the optical axis AX without using the bias spring 7.

In the lens driving device having the above arrangement, whereas displacement output portions 2b of a first lever member 2A are moved toward the object side by actuation of a first SMA actuator 3A, displacement output portions 2b of a second lever member 2B are displaced toward a base member 4 by actuation of a second SMA actuator 3B. Specifically, the second lever member 2B is pivotally supported on a support leg 8B near a distal end of an extension 22 closer to the base member 4; and a displacement input portion 2a, i.e., a V-shaped groove 2a is formed on the second lever member 2B at a position closer to an arm portion 21 than the support position. In this arrangement, as the second SMA actuator 3B is displaced, i.e., contracted, displacement output portions 2b of the second lever member 2B are displaced toward the base member 4.

In this embodiment, the lens unit 1 has a single pair of support portions 16 circumferentially away from each other by 180 degrees in angle. In an inoperative state of the first SMA actuator 3A and the second SMA actuator 3B, the displacement output portions 2b of the first lever member 2A are abutted against the support portions 16 on the side of the base member 4, and the displacement output portions 2b of the second lever member 2B are abutted against the support portions 16 on the object side.

In the lens driving device having the above arrangement, by actuation, i.e., contraction of the first SMA actuator 3A, the displacement output portions 2b of the first lever member 2A are displaced toward the object side, whereby a driving force toward the object side is applied to the lens unit 1. On the other hand, by actuation, i.e., contraction of the second SMA actuator 3B, the displacement output portions 2b of the second lever member 2B are displaced toward the base member 4, whereby a driving force to move the lens unit 1 toward the base member 4 is applied to the lens unit 1. Energization currents or the like to be applied respectively to the first SMA actuator 3A and the second SMA actuator 3B are individually controlled, and a difference in driving force is adjusted between the first SMA actuator 3A and the second SMA actuator 3B. Thereby, the orientation of displacement and the displacement amount of the lens unit 1 are determined.

As described above, the lens driving device in accordance with the third embodiment, which is constructed in such a manner that the lens unit 1 is moved in opposite directions along the optical axis AX in accordance with control of an energization current to be applied to the first SMA actuator 3A and the second SMA actuator 3B, is particularly advantageous in enhancing responsiveness in moving the lens unit 1 toward the base member 4, as compared with an arrangement of moving the lens unit 1 by utilizing a resilient force of the bias spring 7. Accordingly, the above arrangement enables to perform position control for lens movement required in auto-focusing or optical zooming with superior responsiveness.

The lens driving devices in accordance with the first, the second, and the third embodiments are merely preferred examples of a lens driving device embodying the invention, i.e., a lens driving device to which a driving mechanism embodying the invention is applied. The specific arrangement of the lens driving device may be properly modified or altered, as far as such modifications and alterations do not depart from the gist of the invention. For instance, the invention may be modified as follows.

Figure 8:
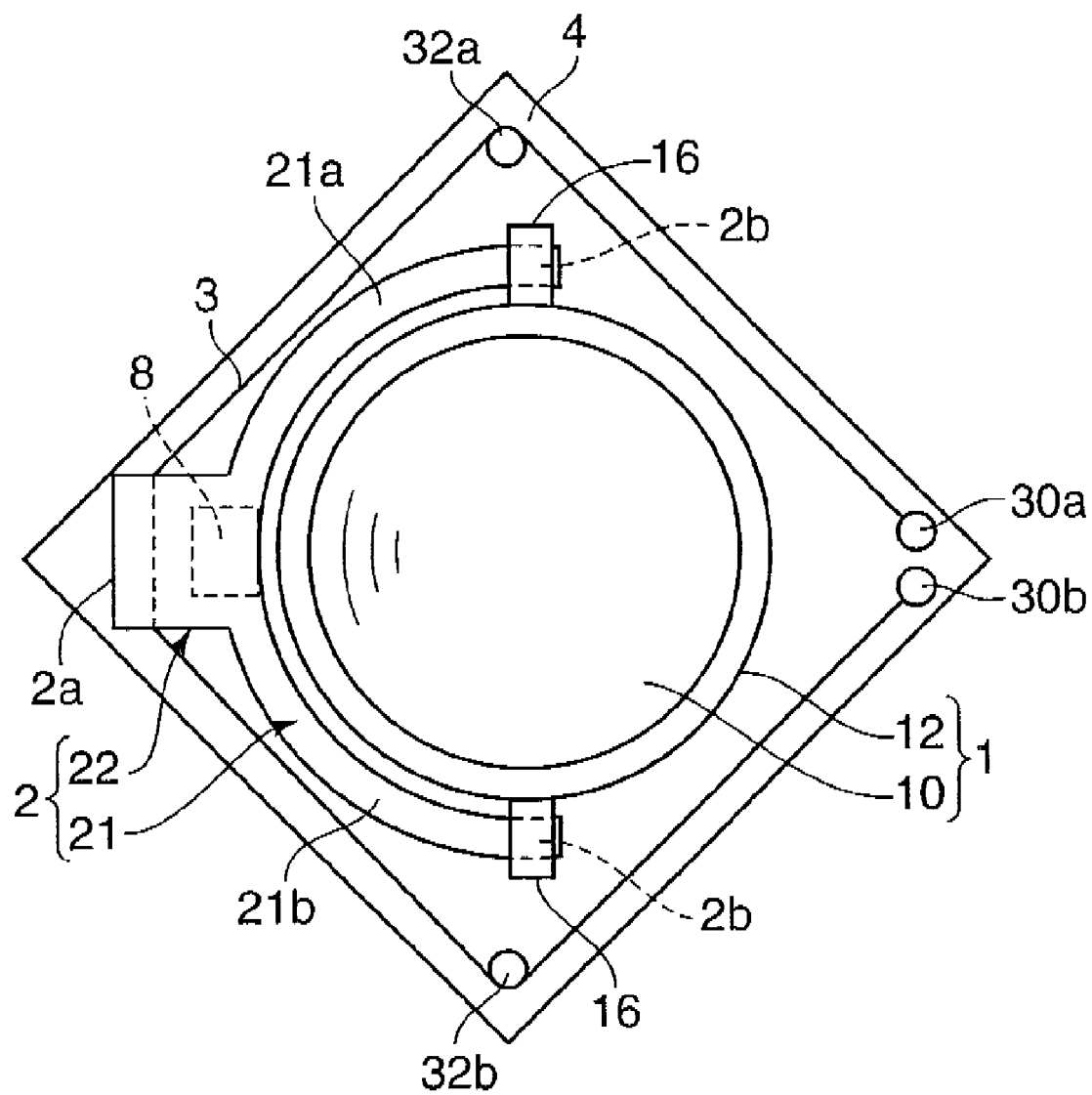
FIG. 8 is a schematic plan view showing a modification of the lens driving device in accordance with the first embodiment.

(1) In the first embodiment, the first electrode 30a and the second electrode 30b of the SMA actuator 3 are arranged near the respective corresponding support portions 16 of the lens unit 1. Alternatively, as shown in e.g. FIG. 8, the lens driving device may be modified, wherein a first electrode 30a and a second electrode 30b are arranged at a position diagonal to a mounting position of a lever member 2, i.e., a support leg 8, among four corner portions of a base member 4; and an SMA actuator 3 is wound around in such a manner that the SMA actuator 3 starts at the first electrode 30a, is wound around a guide member 32a to be disposed near one of the support portions 16 of a lens unit 1, a displacement input portion 2a of the lever member 2, and a guide member 32b to be disposed near the other of the support portions 16, and returns to the second electrode 30b. In this arrangement, since a sufficient length of the SMA actuator 3 can be secured along an outer perimeter of the base member 4, a great displacement can be secured with respect to a contraction amount of the SMA actuator 3. The above feature is also applied to the first SMA actuator 3A and the second SMA actuator 3B in the second and the third embodiments.

Figure 9:
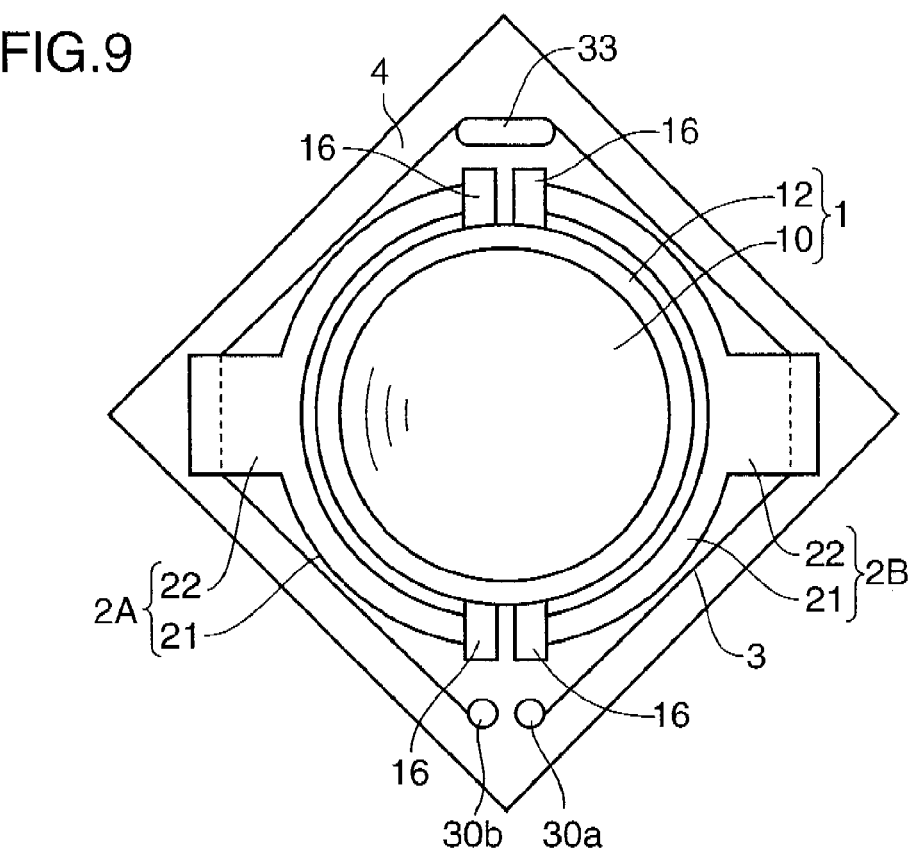
FIG. 9 is a schematic plan view showing a modification of the lens driving device in accordance with the second embodiment.

(2) In the second embodiment, the first lever member 2A and the second lever member 2B are pivotally moved by individual actuation of the first SMA actuator 3A and the second SMA actuator 3B. Alternatively, the first lever member 2A and the second lever member 2B may be pivotally moved by a single SMA actuator. More specifically, as shown in e.g. FIG. 9, the lens driving device may be modified, wherein the SMA actuator 3 is wound around a first lever member 2A, a second lever member 2B, and a guide member 33 in such a manner that the SMA actuator 3 starts at a position near one of support portions 16 of a lens unit 1, is wound around an extension 22 of the first lever member 2A, the guide member 33 to be disposed near the other of the support portions 16, and an extension 22 of the second lever member 2B, and returns to a position near the one of the support portions 16. In this arrangement, in pivotally moving the two lever members 2A and 2B by the single SMA actuator 3, the entire length of the SMA actuator 3 can be made substantially twice as long as the length of each SMA actuator 3A, 3B in the second embodiment (see FIG. 5). Accordingly, the contraction amount of the SMA actuator 3 can be made about twice as large as the contraction amount of each SMA actuator 3A, 3B in the second embodiment. Consequently, similarly to the second embodiment, the lens unit 1 can be driven at a driving force about twice as large as the driving force in the first embodiment. As described above, the modification is advantageous in reducing a load required in energization control, because movement of the lens unit 1 can be controlled by energization control of the single SMA actuator 3.

Figure 10:
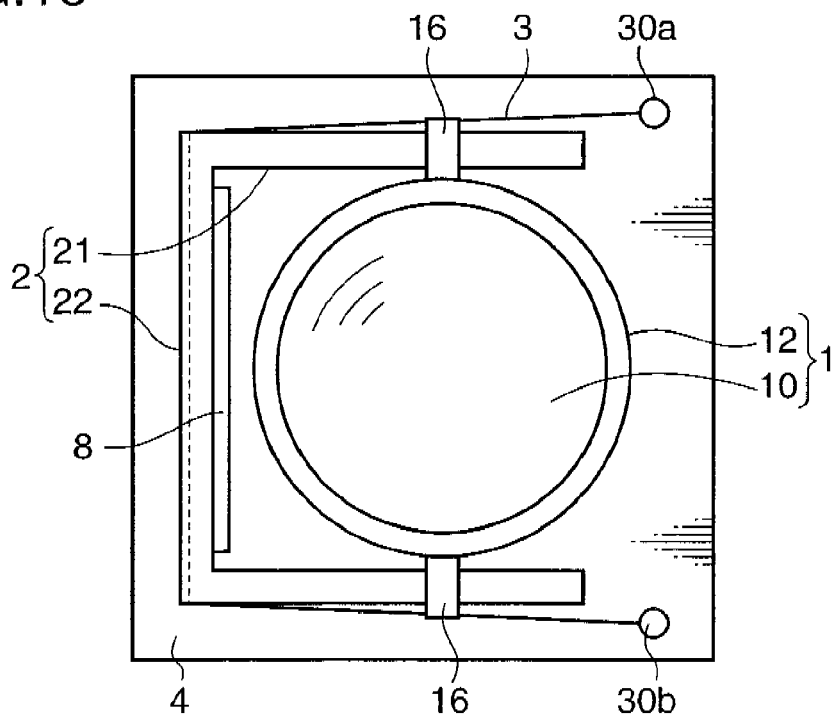
FIG. 10 is a schematic plan view showing another modification of the lens driving device in accordance with the first embodiment.

(3) In the first through the third embodiments, the lever member 2 (2A, 2B) has the arm portion 21 formed into an arc shape in plan view. The shape of the arm member 21 is not limited to an arc shape. As shown in e.g. FIG. 10, the arm portion 21 may have a substantially U-shape in plan view. The arc-shaped arm portion 21, however, is desirable in reducing the size and the weight of the lens driving device, because the curved portions of the arm portion 21 can be made closer to each other along an outer surface of the lens unit 1.

Figure 11:
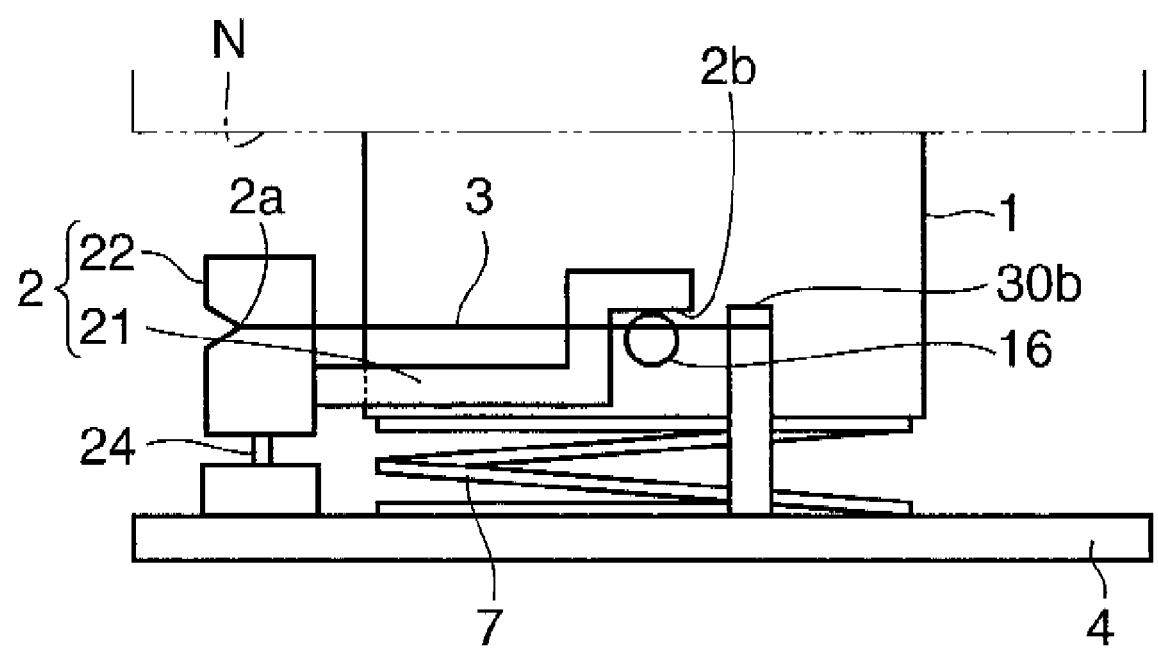
FIG. 11 is a schematic side view showing yet another modification of the lens driving device in accordance with the first embodiment.

(4) In the first and the second embodiments, the bias spring 7 is arranged between the fixed portion N such as an inner wall of a housing of a mobile phone, and the lens unit 1. Alternatively, as shown in FIG. 11, the lens driving device may be constructed in such a manner that a bias spring 7 is provided between a lens unit 1 and a base member 4. Specifically, in the modification, while an SMA actuator 3 is in an inoperative state, i.e., an expanded state, the lens unit 1 is pressed toward a fixed portion N by a pressing force of the bias spring 7, whereby the lens unit 1 is retained at the home position. On the other hand, once the SMA actuator 3 is actuated, i.e., contracted, the lever member 2 is pivotally moved to move displacement output portions 2b toward the base member 4. As a result, the lens unit 1 is moved toward the base member 4 against the pressing force of the bias spring 7.

The support structure of the lever member 2 may have a structure, as shown in FIG. 11, wherein the lever member 2 is mounted on the base member 4 via a resilient hinge member 24 such as a rubber member or a plate spring, in place of the arrangement as described in the first through the third embodiments, wherein the lever member 2 is supported on the support leg 8. In other words, the support structure of the lever member 2 may be a structure, wherein the lever member 2 is pivotally supported by utilizing a flexure of the resilient hinge member 24. Further alternatively, the support structure of the lever member 2 may be a general structure, wherein the lever member 2 is pivotally supported by using an axis hinge. As described in the first through the third embodiments, however, the arrangement that the lever member 2 is supported on the support leg 8 is advantageous in simplifying the structure and facilitating assembling the parts, because there is no need of connecting the lever member 2 to the support leg 8.

(5) In the first and the second embodiments, the SMA actuator 3 (3A, 3B) is a so-called one-way SMA actuator having a property that the shape thereof is retained even after actuation, i.e., contraction of the SMA actuator. In view of this, in the first and the second embodiments, the bias spring 7 is provided to reset the lens unit 1 to the home position. Alternatively, a so-called two-way SMA actuator may be used as the SMA actuator 3 (3A, 3B). Use of the two-way SMA actuator enables to eliminate use of the bias spring 7. This is advantageous in reducing the size and the weight of the lens driving device.

In the foregoing embodiments, the lever member 2 and the SMA actuator 3 (3A, 3B) constitute a driving mechanism, and the lens unit 1 is driven i.e. moved by the driving mechanism. It is needless to say that the driving mechanism in accordance with the foregoing embodiments is not only applied to drive the lens unit 1, but also applied to drive various driven members other than the lens unit 1.

The specification discloses the aforementioned arrangements. The following is a summary of the primary arrangements of the embodiments.

A driving mechanism according to an aspect of the invention is a driving mechanism for driving a driven member. The driving mechanism comprises: a lever member including a plurality of displacement output portions to be engaged with the driven member, and a displacement input portion for receiving an input of a moving force from the outside, the lever member being pivotally moved by the input of the moving force to the displacement input portion for moving the displacement output portions in a predetermined first axis direction; and a shape memory alloy actuator for applying the moving force to the displacement input portion. The lever member includes an arm portion for surrounding a part of the driven member in a side direction. The arm portion includes the plurality of the displacement output portions. A displacement amount of the displacement output portion in the first axis direction is greater than a displacement amount of the displacement input portion to be generated by the input of the moving force.

In the above arrangement, the lever member is pivotally moved by application of the moving force to the displacement input portion resulting from actuation of the shape memory alloy actuator. The driven member is moved in the first axis direction by displacement of the displacement output portions resulting from the pivotal movement of the lever member In performing this operation, since the lever member is engaged with the driven member at the plural displacement output portions, the driven member can be stably moved while preventing oblique movement of the driven member. Also, the lever member is constructed in such a manner that the displacement amount of the displacement output portion in the first axis direction is made larger than the displacement amount of the displacement input portion by the input of the moving force. This arrangement enable to apply, to the driven member, a displacement larger than the actual displacement of the shape memory alloy actuator. Further, the lever member can be arranged in the periphery of the driven member in a compact manner, despite that the plural displacement portions are formed on the lever member to move the driven member.

In the driving mechanism, preferably, the shape memory alloy actuator may be a wire actuator, and the shape memory alloy actuator may be wound around the displacement input portion in a substantially L-shape.

In the above arrangement, the displacement amount of the displacement input portion by actuation of the shape memory alloy actuator is set larger than the actual displacement amount, i.e., expansion/contraction amount of the actuator in the first stage of displacement increase. Accordingly, displacement, i.e., expansion/contraction of the shape memory alloy actuator can be increased in two stages to transmit the displacement to the driven member by increase of the displacement amount in the first stage of displacement increase, and increase of the displacement amount by the lever member in the second stage of displacement increase. This enables to apply a greater displacement to the driven member with a relatively small displacement of the shape memory alloy actuator.

In the driving mechanism, preferably, the lever member may include the arm portion extending along a side portion of the driven member, and an extension extending from an intermediate portion of the arm portion in the first axis direction, the extension including the displacement input portion, and the shape memory alloy actuator may apply the moving force in a second axis direction orthogonal to the first axis direction.

The above arrangement enables to arrange the lever member and the shape memory alloy actuator in the periphery of the driven member in a compact manner. This is advantageous in reducing the size and the weight of the driving mechanism.

In the driving mechanism, preferably, the shape memory alloy actuator may be a wire actuator, and the shape memory alloy actuator may be provided on a plane orthogonal to the first axis direction. The above arrangement enables to reduce the space for the shape memory alloy actuator in the first axis direction. This is more advantageous in reducing the size and the weight of the driving mechanism.

In the driving mechanism, preferably, the lever member may be pivotally supported on a lead end of a support leg at a boundary portion between the arm portion and the extension, and the shape memory alloy actuator may be wound in such a manner that the arm portion of the lever member is abutted against the driven member while the shape memory alloy actuator is in an inoperative state. The above arrangement enables to support the lever member on the lead end of the support leg, without connection of the lever member to the lead end of the support leg. This is advantageous in simplifying the structure for pivotally supporting the lever member, and reducing the size and the weight of the driving mechanism. The above arrangement is also advantageous in facilitating assembling the parts.

In the driving mechanism, preferably, the lever member in a pair may be arranged as opposed to each other with respect to the driven member.

In the above arrangement, a driving force is applied to the driven member by the paired lever members. This enables to apply a greater driving force to the driven member, which is advantageous in moving the driven member at a high speed, and enhancing responsiveness.

Preferably, the single shape memory alloy actuator may apply the moving force to each of the lever members. In the above arrangement, the lever members are driven by the single shape memory alloy actuator. This is advantageous in simplifying the structure, and reducing the size and the weight of the driving mechanism. The above arrangement also enables to reduce a load in energization control with respect to the shape memory alloy actuator.

Preferably, each of the lever members may be operable to move the corresponding displacement output portions in the first axis direction by receiving the input of the moving force. In the above arrangement, in response to input of the moving force to one of the lever members, a driving force acting in one direction along the first axis is applied to the driven member. On the other hand, in response to input of the moving force to the other of the lever members, a driving force acting in a direction opposite to the one direction along the first axis is applied to the driven member. This enables to move the driven member in opposite directions along the first axis merely by displacement of the shape memory alloy actuator.

A driving device according to another aspect of the invention comprises a driven member, and the driving mechanism, having one of the aforementioned arrangements, for moving the driven member in a predetermined first axis direction.

A lens driving device according to yet another aspect of the invention comprises a lens unit as a driven member, and the driving mechanism, having one of the aforementioned arrangements, as a driving mechanism for moving the lens unit in the optical axis direction.

In the above arrangement, the lens unit can be desirably moved in the optical axis direction by the driving mechanism. The driving mechanism has a reduced size and a reduced weight, as described above. Accordingly, use of the lens driving device incorporated with the driving mechanism is suitable to be incorporated in a compact image pickup device such as a mobile phone.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A driving mechanism, comprising:
    a lever member including a plurality of displacement output portions to be engaged with a driven member to be driven by the driving mechanism, and a displacement input portion for receiving an input of a moving force from the outside, the lever member being pivotally moved by the input of the moving force to the displacement input portion for moving the displacement output portions in a predetermined first axis direction; and
    a shape memory alloy actuator for applying the moving force to the displacement input portion, wherein
    the lever member includes an arm portion for surrounding a part of the driven member in a side direction, the arm portion including the plurality of the displacement output portions, and
    a displacement amount of the displacement output portions in the first axis direction is greater than a displacement amount of the displacement input portion to be generated by the input of the moving force.

2. The driving mechanism according to claim 1, wherein the shape memory alloy actuator is a wire actuator, and the shape memory alloy actuator is wound around the displacement input portion in a substantially L-shape.

3. The driving mechanism according to claim 1, wherein the lever member includes the arm portion extending along a side portion of the driven member, and an extension extending from an intermediate portion of the arm portion in the first axis direction, the extension including the displacement input portion, and
    the shape memory alloy actuator applies the moving force in a second axis direction orthogonal to the first axis direction.

4. The driving mechanism according to claim 3, wherein the shape memory alloy actuator is a wire actuator, and the shape memory alloy actuator is provided on a plane orthogonal to the first axis direction.

5. The driving mechanism according to claim 3, wherein
the lever member is pivotally supported on a lead end of a support leg at a boundary portion between the arm portion and the extension, and
the shape memory alloy actuator is wound in such a manner that the arm portion of the lever member is abutted against the driven member while the shape memory alloy actuator is in an inoperative state.

6. The driving mechanism according to claim 1, further comprising a second lever member, wherein
the lever member and the second lever member are arranged as opposed to each other with respect to the driven member.

7. The driving mechanism according to claim 6, wherein
the shape memory alloy actuator applies the moving force to each of the lever members.

8. The driving mechanism according to claim 6, wherein
each of the lever members is operable to move the corresponding displacement output portions in the first axis direction by receiving the input of the moving force.

9. A driving device, comprising:
a driven member; and
a driving mechanism for moving the driven member in a predetermined first axis direction,
the driving mechanism including:
a lever member having a plurality of displacement output portions to be engaged with the driven member, and a displacement input portion for receiving an input of a moving force from the outside, the lever member being pivotally moved by the input of the moving force to the displacement input portion for moving the displacement output portions in the predetermined first axis direction; and
a shape memory alloy actuator for applying the moving force to the displacement input portion, wherein
the lever member includes an arm portion for surrounding a part of the driven member in a side direction, the arm portion including the plurality of the displacement output portions, and
a displacement amount of the displacement output portions in the first axis direction is greater than a displacement amount of the displacement input portion to be generated by the input of the moving force.

10. A lens driving device, comprising:
a lens unit; and
a driving mechanism for moving the lens unit in an optical axis direction,
the driving mechanism including:
a lever member having a plurality of displacement output portions to be engaged with the lens unit, and a displacement input portion for receiving an input of a moving force from the outside, the lever member being pivotally moved by the input of the moving force to the displacement input portion for moving the displacement output portions in the optical axis direction; and
a shape memory alloy actuator for applying the moving force to the displacement input portion, wherein
the lever member includes an arm portion for surrounding a part of the lens unit in a side direction, the arm portion including the plurality of the displacement output portions, and
a displacement amount of the displacement output portions in the optical axis direction is greater than a displacement amount of the displacement input portion to be generated by the input of the moving force.

* * * * *